(12) United States Patent
Mervic et al.

(10) Patent No.: US 11,345,545 B2
(45) Date of Patent: May 31, 2022

(54) METHOD AND PLANT FOR PRODUCING TYRES FOR VEHICLE WHEELS

(71) Applicant: PIRELLI TYRE S.P.A., Milan (IT)

(72) Inventors: Stefano Mervic, Milan (IT); Marco Cantu', Milan (IT); Walter Mandelli, Bellinzago Lombardo (IT)

(73) Assignee: PIRELLI TYRE S.p.A., Milan (IT)

( * ) Notice: Subject to any disclaimer, the term of this patent is extended or adjusted under 35 U.S.C. 154(b) by 676 days.

(21) Appl. No.: 14/436,747

(22) PCT Filed: Oct. 22, 2013

(86) PCT No.: PCT/IB2013/059543
§ 371 (c)(1),
(2) Date: Apr. 17, 2015

(87) PCT Pub. No.: WO2014/064614
PCT Pub. Date: May 1, 2014

(65) Prior Publication Data
US 2015/0259142 A1    Sep. 17, 2015

Related U.S. Application Data

(60) Provisional application No. 61/720,150, filed on Oct. 30, 2012.

(30) Foreign Application Priority Data

Oct. 26, 2012 (IT) .................. MI2012A001829

(51) Int. Cl.
*B29D 30/06* (2006.01)
*B65G 1/137* (2006.01)
(Continued)

(52) U.S. Cl.
CPC ............ *B65G 1/137* (2013.01); *B29D 30/005* (2013.01); *B29D 30/0016* (2013.01);
(Continued)

(58) Field of Classification Search
CPC ............ B29D 30/0016; B29D 30/0603; B29D 2030/0055; B65G 1/137; B65G 2201/0273
See application file for complete search history.

(56) References Cited

U.S. PATENT DOCUMENTS 4,773,810 A * 9/1988 Nishimura ......... B29D 30/0016
198/349.6
4,993,906 A * 2/1991 Nisimura ............. B29D 30/005
206/386
(Continued)

FOREIGN PATENT DOCUMENTS

EP    0 922 561    6/1999
EP    1 584 439    10/2005
(Continued)

OTHER PUBLICATIONS

Russian Decision of Grant dated Sep. 13, 2017, from the Federal Service for Intellectual Property Office, in counterpart Russian Application No. 2015-118896/05(029254).
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method and plant for producing tyres for vehicle wheels in which: each vulcanizer of a plurality of vulcanizers is associated with a respective pick-up logic of green tyres from at least one storage area of green tyres; upon each request to vulcanize a green tyre in a vulcanizer of the plurality of vulcanizers, the pick-up logic associated with
(Continued)

the vulcanizer is applied to select and pick up a green tyre from the storage area; and the respective pick-up logic associated with each vulcanizer includes a first pick-up rule of green tyres from the storage area and, for at least one of the plurality of vulcanizers, the first pick-up rule is changed into at least one second pick-up rule at least once during the production in the plant of at least one lot of tyres.

12 Claims, 8 Drawing Sheets

(51) Int. Cl.
 *B29D 30/00* (2006.01)
 *B65G 1/00* (2006.01)
(52) U.S. Cl.
 CPC .......... *B29D 30/0603* (2013.01); *B65G 1/00* (2013.01); *B29D 2030/0022* (2013.01); *B29D 2030/0055* (2013.01); *B29D 2030/0677* (2013.01); *B65G 2201/0273* (2013.01); *B65G 2203/0266* (2013.01)

(56) References Cited

U.S. PATENT DOCUMENTS

| | | | |
|---|---|---|---|
| 5,631,028 A * | 5/1997 | Mizokawa | B29C 31/00 414/799 |
| 6,702,912 B1 | 3/2004 | Oku et al. | |
| 2004/0137099 A1 | 7/2004 | Oku et al. | |
| 2006/0036375 A1 | 2/2006 | Hatakeyama | |
| 2010/0307662 A1 | 12/2010 | Mancini et al. | |

FOREIGN PATENT DOCUMENTS

| | | |
|---|---|---|
| JP | 56-4447 | 1/1981 |
| JP | 6-179216 | 6/1994 |
| JP | 7-227850 | 8/1995 |
| JP | 2003-53732 | 2/2003 |
| RU | 2258608 | 8/2005 |
| WO | WO 2007/091315 | 8/2007 |
| WO | WO 2009/040594 | 4/2009 |

OTHER PUBLICATIONS

International Search Report from the European Patent Office for International Applicaton No. PCT/IB2013/059543, dated Apr. 9, 2014.

Written Opinion of the International Searching Authority from the European Patent Office for International Application PCT/IB2013/059543, dated Apr. 9, 2014.

Japanese Notice of Reasons for Rejection dated Sep. 7, 2017, from the Japanese Patent Office, in counterpart Japanese Application No. 2015-538606.

Office Action dated Mar. 10, 2020, by the Brazilian Patent Office in corresponding Application No. BR112015008785-0 (6 pages).

* cited by examiner

METHOD AND PLANT FOR PRODUCING TYRES FOR VEHICLE WHEELS

CROSS REFERENCE TO RELATED APPLICATIONS

This application is a national phase application based on PCT/IB2013/059543, filed Oct. 22, 2013, which claims the priority of Italian Patent Application No. MI2012A001829, filed Oct. 26, 2012, and the benefit of U.S. Provisional Application No. 61/720,150, filed Oct. 30, 2012, the content of each application being incorporated herein by reference.

BACKGROUND OF THE INVENTION

Field of the Invention

The present invention concerns a method and plant for producing tyres for vehicle wheels.

Description of the Related Art

A tyre for vehicle wheels typically comprises a carcass structure, shaped according to a substantially toroidal configuration, comprising at least one carcass ply having respectively opposite end portions. The latter are engaged with respective annular anchoring structures, each normally made of at least one substantially circumferential annular insert called "bead core" on which at least one filler insert is generally applied, tapering radially going away from the rotation axis. The annular anchoring structures are arranged in areas usually identified by the term "beads". The beads have an internal diameter substantially corresponding to a so-called "fitting diameter" of the tyre on a respective assembly rim. The tyre also comprises a crown structure comprising at least one belt strip arranged in a position radially outside the carcass ply with respect to the centre of the tyre and a tread band radially outside the belt strip. On the tread band, longitudinal and transversal grooves are typically formed, arranged so as to define a desired tread pattern. Between the tread band and the belt strip(s) there can be a so-called "under-layer" made from elastomeric material having properties suitable for ensuring a stable connection of the belt strip(s) with the tread band itself. The tyre also comprises a pair of so-called sidewalls made from elastomeric material applied on opposite sides onto the side surfaces of the carcass structure. In "tubeless" tyres, there is, in a radially inner position with respect to the carcass ply, a layer of elastomeric material, usually called "liner", having air-tightness features and generally extending from one of the beads to the other.

The production cycles of a tyre provide that, after a building process in which the various structural components of the tyre itself are made and/or assembled, the built green tyres are transferred into a moulding and vulcanization line where a moulding and vulcanization process is carried out, adapted to define the structure of the tyre according to a desired geometry and tread pattern.

By "elastomeric material" it is meant a composition comprising at least one elastomeric polymer and at least one reinforcing filler. Preferably, such a composition also comprises additives like, for example, a cross-linking agent and/or a plasticiser. Thanks to the presence of the cross-linking agent, such a material can be cross-linked by heating, so as to form the final manufactured product.

By the term "green tyre" it is meant a tyre obtained from the building process and not yet moulded and vulcanized.

By the term "specification" it is meant a set of information indicative of the process and plant for producing a tyre. Such information can comprise information indicative of apparatuses, information indicative of materials and information that defines machine paths (i.e. paths between different work stations inside a building line) to make the different structural components of the tyre inside a production plant. Such information can also comprise information that identifies and describes the moulding and vulcanization process to be carried out.

By the term "subspecification", relative to a predetermined specification, it is meant a set of information that is the same as that of the predetermined specification apart from that indicative of the machine paths that, on the other hand, are different from that of the predetermined specification.

By "lot of tyres" it is meant, for each building line inside a production plant, the number of green tyres built in one work shift.

By "work shift" it is meant a period of activity of the building line comprised between about 1 h and about 24 h, preferably comprised between about 4 h and about 12 h.

WO 2009/040594, to the same Applicant, describes a plant for producing tyres for vehicle wheels comprising a carcass structure building line; a crown structure building line; an assembly and shaping station of the tyre being processes adapted to shape a carcass structure assembling it to the crown structure so as to obtain a green tyre; a moulding and vulcanizing line of the assembled and shaped green tyre; a green tyres storage station; devices for transferring the green tyre from the assembly and shaping station to the green tyres storage station; and devices for transferring the green tyre from the green tyres storage station to the moulding and vulcanizing line. The moulding and vulcanizing line comprises at least two vulcanization units, each provided with at least one vulcanization mould.

U.S. Pat. No. 5,631,028 describes a system for transporting green tyres to a plurality of vulcanizers comprising green tyres loading pallets, a storage area in which the pallets are stored and a transfer device for moving the pallets between the storage area and the vulcanizers. The storage area comprises a first storage area and a second storage area. In the first storage area the transfer device is adapted to remove the pallets in the same sequence in which the pallets were introduced into the first area (first-in first-out or FIFO). In the second storage area the transfer device is adapted to remove the pallets according to a random sequence. In the first area green tyres having a specification of a mass production are stored. In the second area, on the other hand, green tyres having a specification of a wide-variety small-scale production are stored. When there is a request to vulcanize a green tyre, if the specification of the green tyre is for a mass production, a pallet is picked up from the first storage area according to a FIFO logic; if, on the other hand, the specification of the green tyre is for a wide-variety small-scale production, the relative pallet is picked up from the second storage area.

WO 2007/091315 describes a method and plant for simultaneously producing multiple types of tyres. The green tyres are built in building devices and then vulcanized in vulcanization devices. Between the building devices and the vulcanizing devices there is an open storage area in which the green tyres are temporarily stored. On each built green tyre a label is attached containing information indicating the type of product of the green tyre and the position of the green tyre in the storage area. Between the green tyres stored in the storage area, a processing device selects a green tyre for vulcanization from data of the production plan, retrieves the position of the selected green tyre inside the storage area from a database and selects, among the vulcanization devices, the vulcanization device that comprises the vulcanization mould corresponding to the type of product of the selected green tyre. After this, the processing device drives transfer means to transport the selected green tyre from the recovered position inside the storage area to the selected vulcanization device.

SUMMARY OF THE INVENTION

The Applicant observes that in plants of the type described by WO 2009/040594 it is possible to simultaneously produce different types and models of tyre with high technological flexibility, in other words with the possibility of using elementary semi-finished products for each tyre (typically continuous elongated elements, or cut to size, made from elastomeric material that can incorporate textile or metal cords, rubber-coated metal wires) having different characteristics from one another by type of elastomeric material or by type of reinforcing cord or metal wire.

The Applicant observes that in production plants of the type described by WO 2009/040594 there can be simultaneously tyres of normal production and tyres in development/industrialisation having different specifications and sub-specifications. In particular, the development/industrialisation phase is often characterised by a high frequency of variation of the specifications/sub-specifications of the tyres made.

In this context of high technological flexibility, the Applicant has realised that, in order to ensure the latter together with high productivity of the production plant as a whole, it is necessary to ensure equally flexible management of the green tyres that are picked up and sent from the storage station to the vulcanization line.

The Applicant observes that the system described by U.S. Pat. No. 5,631,028 does not allow the aforementioned objectives to be achieved efficiently. Indeed, such a system, providing two different types of storage areas, the first with FIFO (First In First Out) pick-up logic and for mass production tyres and the second with random pick-up logic and for wide-variety small-scale production tyres, does not allow different pick-up logics to be applied once the tyres have been stored in the respective storage area. Moreover, such a system does not allow pick-up logics different from FIFO to be applied for mass production tyres or pick-up logics different from random to be applied for wide-variety small-scale production tyres. In addition, the Applicant observes that the system described by U.S. Pat. No. 5,631,028 provides the movement of loading pallets in which four green tyres of the same specification are loaded at a time. Such a system therefore provides, both in the case of FIFO pick-up logic and in the case of random pick-up logic, a pick-up and movement of four green tyres at a time and not of single green tyres.

The Applicant also observes that in plants of the type described by WO 2007/091315 it is possible to vulcanize specific tyres, based on what is required by the production plan. However, they only foresee a pick-up logic from the storage area: that of the specific tyre that can be identified through a suitable label. Moreover, they foresee to select the vulcanizer to be used based on the product type of the specific tyre selected. Problems relative to unavailability of one or more vulcanizers and/or to non-optimal use of the pick-up and transfer devices of the green tyres inside the storage area due to the use of a single punctual pick-up logic, could generate inefficiency, losses in productivity and possible ageing problems of the green tyres stored in the storage area.

The Applicant has realised that the use of pick-up logics of the green tyres towards one or more vulcanizers, which are flexible in the case of specific needs at specific moments within a production of a lot of tyres, could overcome the problems outlined above, particularly in modern plants with high technological flexibility like those described in WO 2009/040594.

The Applicant has found that, by associating each vulcanizer with a respective pick-up logic of green tyres and by applying, upon each request to vulcanize a green tyre in a vulcanizer, the pick-up logic currently associated with such a vulcanizer to select and pick up a green tyre from the storage area, a flexible and efficient management of each tyre produced in the plant is obtained. The pick-up logic is preferably varied as a function of current requirements of the production plant within a production of at least one lot of tyres.

In accordance with a first aspect thereof, the invention thus relates to a method for producing tyres for vehicle wheels comprising: associating each vulcanizer of a plurality of vulcanizers of a production plant with a respective pick-up logic of green tyres from at least one storage area of green tyres.

Preferably, upon each request to vulcanize a green tyre in a vulcanizer of said plurality of vulcanizers, it is provided to apply the pick-up logic associated with said vulcanizer to select and pick up a green tyre from said at least one storage area.

Preferably, it is provided to transfer the selected and picked up green tyre to said vulcanizer.

Preferably, the respective pick-up logic associated with each vulcanizer comprises a first pick-up rule of green tyres from said at least one storage area.

Preferably, for at least one of said vulcanizers, said first pick-up rule is changed into at least one second pick-up rule at least once during the production, in said plant, of at least one lot of tyres.

The Applicant believes that in this way it is advantageously possible to automatically select and pick up from the storage area a green tyre (for example specific, or having determined specification, or having determined specification and subspecification) that satisfies the current requirements of service, production and/or development of the production process, each time a vulcanizer is ready to vulcanize a green tyre. In this way a flexible and efficient management of pick-up and sending of green tyres from the storage area to the vulcanization line is ensured.

In accordance with a second aspect thereof, the invention concerns a production plant of tyres for vehicle wheels comprising at least one building line of green tyres.

Preferably, at least one storage area is adapted to store the green tyres built in said at least one building line.

Preferably, there is a plurality of vulcanizers.

Preferably, at least one transfer device is adapted to transfer the green tyres from said at least one storage area to said plurality of vulcanizers.

Preferably, a processing unit is adapted to associate each vulcanizer with a respective pick-up logic of green tyres from said at least one storage area.

Preferably, said processing unit is adapted, upon each request to vulcanize a green tyre in a vulcanizer of said plurality of vulcanizers, to apply the pick-up logic associated with said vulcanizer to drive said at least one transfer device to select and pick up a green tyre from said at least one storage area and transfer it to said vulcanizer.

Preferably, the respective pick-up logic associated with each vulcanizer comprises a first pick-up rule of green tyres from said at least one storage area.

Preferably, for at least one of said vulcanizers, said processing unit is adapted to change said first pick-up rule into at least one second pick-up rule at least once during the production, in said plant, of at least one lot of tyres.

The present invention in at least one of the aforementioned aspects can have at least one of the following preferred characteristics.

Preferably, when the production plant comprises a single storage area of green tyres, the storage area of green tyres is configured so as to allow the application of said first pick-up rule and of said at least one second pick-up rule.

Preferably, when the production plant comprises more than one storage area of green tyres, at least one of said storage areas is configured so as to allow the application of said first pick-up rule and of said at least one second pick-up rule.

In an embodiment, when the production plant comprises more than one storage area of green tyres, all of the storage areas are configured so as to allow the application of said first pick-up rule and of said at least one second pick-up rule.

Preferably, said first pick-up rule and said at least one second pick-up rule are different.

Preferably, said first pick-up rule is changed into said at least one second pick-up rule as a function of requirements of the production plant during the production of said at least one lot of tyres.

Preferably, the green tyres are associated with specifications $Sp_j$ and, for each specification $Sp_j$, subspecifications $Su_h$, with $1 \leq j \leq n$, $1 \leq h \leq m$, and n, m integers greater than or equal to 1.

Preferably, each vulcanizer of said plurality of vulcanizers is configured to vulcanize a green tyre associated with a predetermined specification $Sp_j$.

Preferably, said first pick-up rule and said at least one second pick-up rule provide to select a green tyre that is associated with the predetermined specification $Sp_j$ for which said vulcanizer is configured.

In an embodiment, said first pick-up rule is selected from a plurality of pick-up rules comprising: FIFO on the specification $Sp_j$ for which the vulcanizer is configured; FIFO on a predetermined subspecification $Su_j$ of the specification $Sp_j$ for which the vulcanizer is configured; LIFO (Last In First Out) on the specification $Sp_j$ for which the vulcanizer is configured; LIFO on a predetermined subspecification $Su_h$ of the specification $Sp_j$ for which the vulcanizer is configured; punctual selection of a specific green tyre; random selection of a green tyre.

Preferably, for at least one of said vulcanizers said first pick-up rule is selected from a plurality of pick-up rules comprising: FIFO on the specification $Sp_j$ that said vulcanizer is adapted to vulcanize; FIFO on a predetermined subspecification $Su_j$ of the specification $Sp_j$ that said vulcanizer is adapted to vulcanize; LIFO on the specification $Sp_j$ that said vulcanizer is adapted to vulcanize; LIFO on a predetermined subspecification $Su_j$ of the specification $Sp_j$ that said vulcanizer is adapted to vulcanize.

In an embodiment, said at least one second pick-up rule is selected from a plurality of pick-up rules comprising: FIFO on the specification $Sp_j$ for which the vulcanizer is configured; FIFO on a predetermined subspecification $Su_h$ of the specification $Sp_j$ for which the vulcanizer is configured; LIFO on the specification $Sp_j$ for which the vulcanizer is configured; LIFO on a predetermined subspecification $Su_h$ of the specification $Sp_j$ for which the vulcanizer is configured; punctual selection of a specific green tyre; random selection of a green tyre.

Preferably, the punctual selection of a specific green tyre is carried out through a univocal green tyre identifier.

Preferably, the punctual selection of a specific green tyre is carried out by using a suitable label containing the univocal green tyre identifier.

Preferably the univocal identifier is a barcode.

Preferably, at least one of said plurality of pick-up rules comprises an indication of a number of green tyres onto which applying the rule.

Preferably said number of green tyres onto which to apply the rule is undefined or defined.

Preferably, when the production plant comprises more than one storage area of green tyres, at least one of said plurality of pick-up rules indicates whether it must be applied to a specific storage area or to all of the storage areas of the production plant or to a part thereof.

In an embodiment, said respective pick-up logic is different for at least two vulcanizers of the plurality of vulcanizers.

Preferably, for the vulcanizers, among said plurality of vulcanizers, which are configured to vulcanize green tyres associated with a predetermined specification $Sp_j$ relative to a mass production, said first pick-up rule is a FIFO pick-up rule on said predetermined specification $Sp_j$.

Preferably, for the vulcanizers, among said plurality of vulcanizers, which are configured to vulcanize green tyres associated with a predetermined specification $Sp_j$ relative to a mass production, said first pick-up rule is a FIFO pick-up rule on a predetermined subspecification $Su_j$ of said predetermined specification $Sp_j$.

Preferably, said at least one of said vulcanizers, for which said first pick-up rule is changed into said at least one second pick-up rule, is configured to vulcanize green tyres associated with a predetermined specification $Sp_j$ relative to a developing production.

Preferably, the green tyre is selected and picked up from said at least one storage area and transferred to said vulcanizer through at least one transfer device.

Preferably, it is provided to build green tyres.

Preferably, building green tyres comprises building a carcass structure.

Preferably, building green tyres comprises building a crown structure, said crown structure comprising at least one belt structure.

Preferably, building green tyres comprises the assembly and the shaping of a green tyre being processed by shaping the carcass structure and assembling it to the crown structure.

Preferably, it is provided to store the built green tyres in said at least one storage area of green tyres.

Preferably, it is provided to mould and vulcanize the green tyres in said plurality of vulcanizers.

Preferably, the processing unit is positioned in a remote position with respect to said at least one storage area.

In an embodiment, L building lines of green tyres are provided with $1 < L \leq N$ and N integer greater than or equal to 2.

In an embodiment, K storage areas of green tyres are provided with $1 < K \leq P$ and P integer greater than or equal to 2.

Preferably, said at least one transfer device is adapted to transfer the green tyres from said K storage areas to said plurality of vulcanizers.

Preferably, upon each request to vulcanize a green tyre in a vulcanizer of said plurality of vulcanizers, said processing unit is adapted to apply the pick-up logic associated with said vulcanizer to drive said at least one transfer device to select and pick up a green tyre among said K storage areas and transfer it to said vulcanizer.

Preferably, said at least one transfer device comprises a robotized arm.

Preferably, there is a plurality of transfer devices adapted to transfer the green tyres from said at least one storage area to said vulcanizers.

Preferably, said at least one building line of green tyres comprises a carcass structures building line.

Preferably, said at least one building line of green tyres comprises a crown structures building line.

Preferably, said at least one building line of green tyres comprises a shaping and assembly station of the green tyre being processed adapted to shape the carcass structure and to assemble it to the crown structure.

BRIEF DESCRIPTION OF THE DRAWINGS

Further characteristics and advantages of the present invention are illustrated by the following detailed description of some exemplary embodiments thereof, provided solely as non-limiting examples, said description being made with reference to the attached drawings, in which.

DETAILED DESCRIPTION OF THE INVENTION

Figure 1:
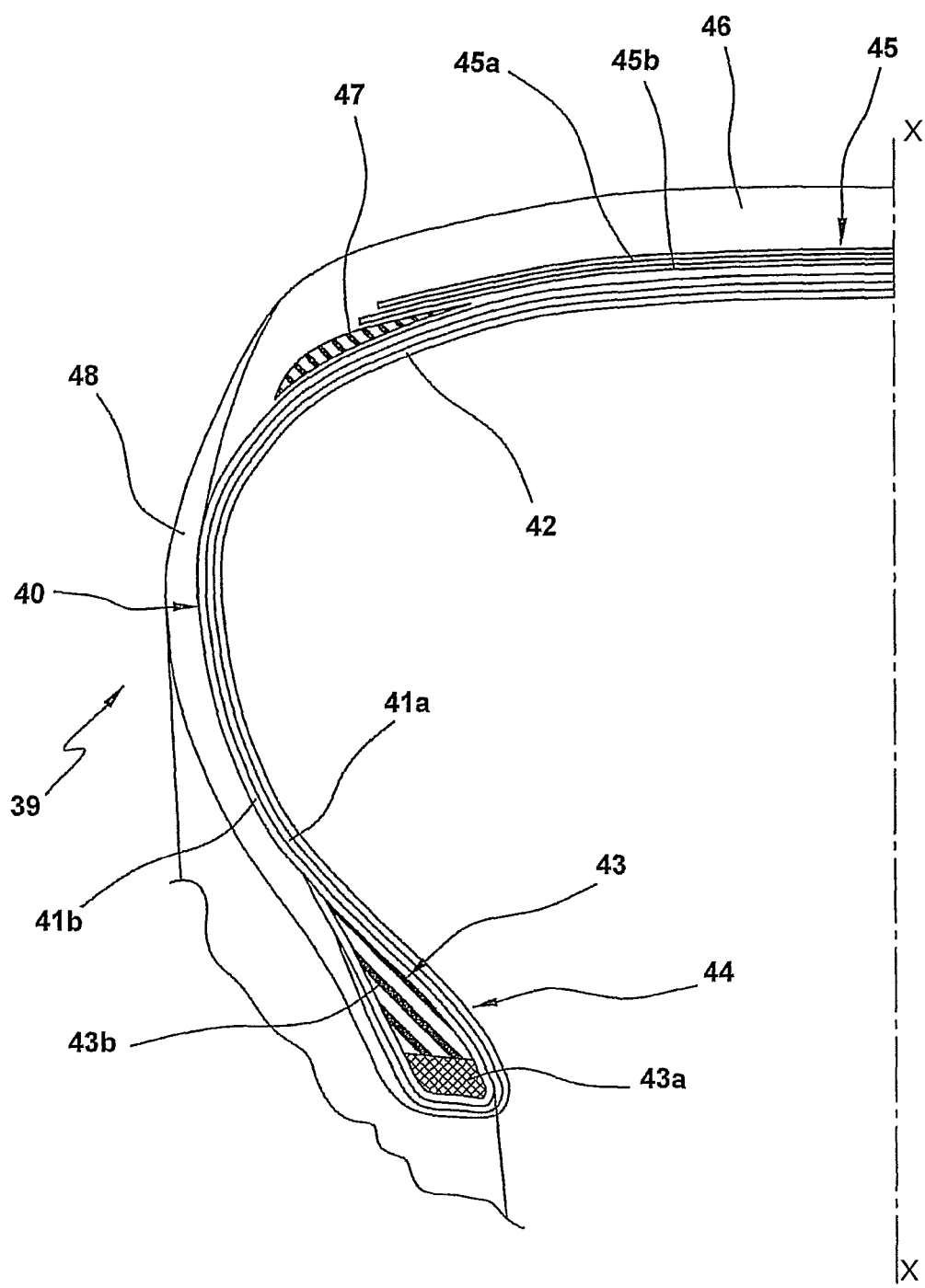
FIG. 1 shows a radial half-section of a tyre for vehicle wheels that can be produced according to the invention.

FIG. 1 schematically shows an example of a tyre 39 for vehicle wheels that can be produced according to the present invention. For the sake of simplicity of illustration, FIG. 1 shows just one half of the tyre 39, the other half being the mirror-image with respect to the axis XX shown in FIG. 1.

The tyre 39 essentially comprises a carcass structure 40 shaped according to a substantially toroidal configuration having at least one carcass ply 41a and/or 41b. A layer of impermeable elastomeric material or so-called liner 42 is applied in a radially inner position, with respect to the centre of the tyre, to the carcass ply/plies 41a, 41b. Two annular anchoring structures 43 each comprising a so-called bead core 43a on which an elastomeric filler 43b is applied, are engaged at respective end portions of the carcass ply/plies 41a and/or 41b. The annular anchoring structures 43 are positioned close to an area usually identified by the term "beads" 44, at which the engagement between the tyre 39 and a respective assembly rim (not shown) usually takes place. A belt structure 45, comprising several belt strips 45a, 45b, is circumferentially applied around the carcass ply/plies 41a and/or 41b, in a position radially outside them, and a tread band 46 is circumferentially placed over the belt structure 45, in a position radially outside it.

The belt structure 45 can be associated with so-called "sub-belt inserts" 47 each arranged between the carcass ply/plies 41a and/or 41b and one of the axially opposite end edges of the belt structure 45. Two sidewalls 48, each extending from the respective bead 44 to a respective side edge of the tread band 46, are applied in laterally opposite positions onto the carcass ply/plies 41a and/or 41b.

Figure 2:
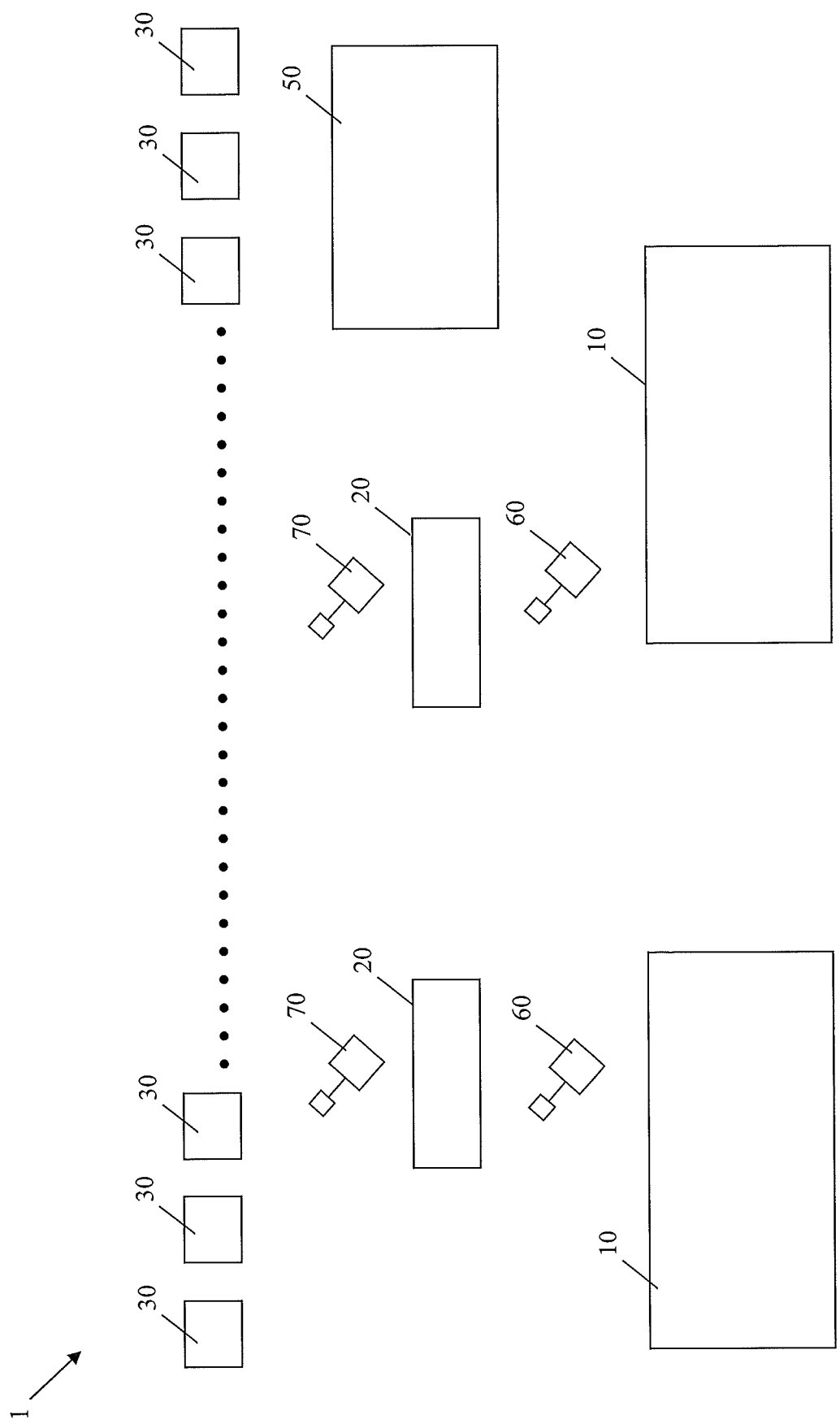
FIG. 2 schematically shows an embodiment of a plant for producing tyres for vehicle wheels according to the invention.

FIG. 2 shows a plant 1 for producing tyres for vehicle wheels according to the invention comprising L building lines 10 of green tyres (with L=2); K storage areas 20 (with K=2) adapted to store the green tyres built in said building lines 10; a plurality of vulcanizers 30; at least one transfer device 70 (as an example, in the figures two are illustrated) adapted to transfer the green tyres from the storage areas 20 to said plurality of vulcanizers 30; and at least one transfer device 60 (as an example, in the figures two are illustrated) adapted to transfer the built green tyres from the building lines 10 to the storage areas 20.

Each building line 10 can be associated with a respective storage area 20, with a respective transfer device 60 and with a respective transfer device 70. Moreover, each storage area 20 with the respective transfer device 70 can be associated with a respective subset of the vulcanizers 30.

Alternatively, the storage areas 20 and/or the transfer devices 60 and/or the transfer devices 70 and/or the vulcanizers 30 can be shared.

In the vulcanizers 30 a step of vulcanizing and moulding the green tyres coming from the building lines 10 is carried out. Each vulcanizer 30 is configured to vulcanize a green tyre associated with a predetermined specification $Sp_j$.

Figure 3:
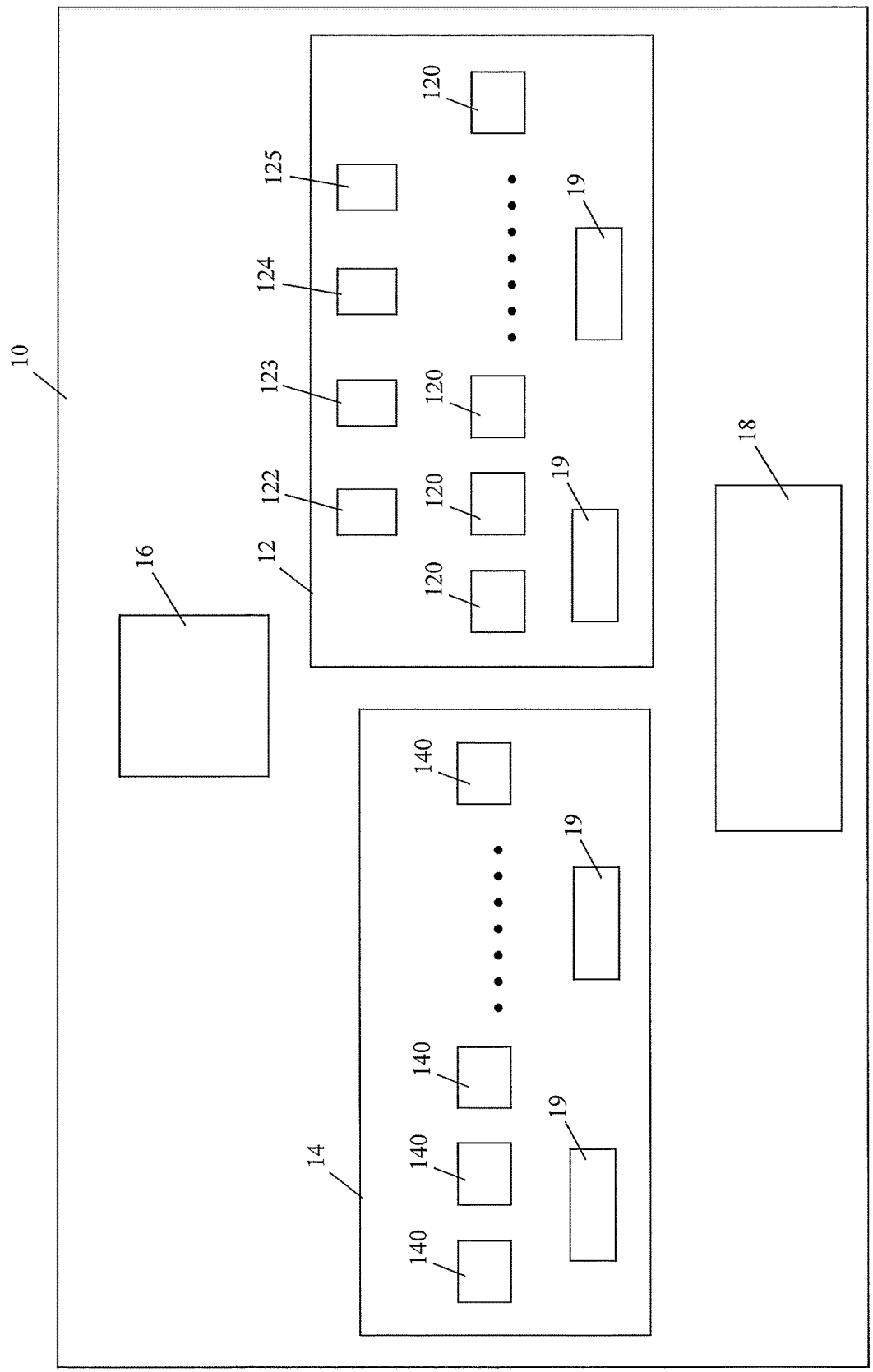
FIG. 3 schematically shows an embodiment of a building line of green tyres for a production plant according to the invention.

Each building line 10 of green tyres advantageously comprises a carcass structures building line 12, a crown structures building line 14 and a shaping and assembly station 16 (FIG. 3).

The carcass structures building line 12 is adapted to form, on a forming drum, a carcass structure 40 and, possibly, at least one part of the sidewalls 48.

At the same time, the crown structures building line 14 is adapted to form, on another forming drum, a crown structure comprising at least the belt structure 45, the tread band 46 and, possibly, at least one part of the sidewalls 48.

In the shaping and assembly station 16, the carcass structure 40, formed on its own forming drum in the carcass structures building line 12, is shaped and assembled to the crown structure, formed in the crown structures building line 14.

The green tyres built in the L building lines 10 are transferred from the respective shaping and assembly stations 16 to the storage areas 20 through the transfer devices 60.

In a preferred embodiment, the transfer devices 60 are robotized arms, preferably anthropomorphic.

Once stored in the storage areas 20, the green tyres are then transferred, through the transfer devices 70, to the vulcanizers 30 to be moulded and vulcanized.

In a preferred embodiment, the transfer devices 70 are robotized arms, preferably anthropomorphic, adapted to select and pick up a desired green tyre (punctually and/or according to predetermined specification and, possibly sub-specification) from the storage areas 20.

In a preferred embodiment, the carcass structures building line 12 and the crown structures building line 14 each comprise a plurality of work stations, 120 and 140 respectively, arranged in series and one or more moving devices (for example robotized arms, preferably anthropomorphic, not illustrated) adapted to move a plurality of forming drums (not shown) between the various work stations 120, 140. The moving devices are advantageously adapted to move the forming drums from any first work station of said plurality of work stations 120, 140 to any other second work station 120, 140, wherein the first and second work station can be adjacent or not.

The plurality of work stations 120 of the carcass structures building line 12 comprises at least two of the following stations: reinforcement fabric application station to apply at least one bead reinforcement fabric onto a forming drum; a first anti-abrasive application station to apply at least one first portion of an anti-abrasive element in a position radially outside the forming drum; liner application station for applying a layer of liner in a position radially outside the forming drum; a sub-liner application station for applying a layer of sub-liner in a position radially outside said liner; self-sealing material application station for applying a layer of self-sealing material, for example in a position radially outside the layer of sub-liner; a plies application station for applying one or more carcass plies in a position radially outside the forming drum; an annular anchoring structures application station for applying, at the axially opposite ends of the carcass ply/plies, at least one pair of annular anchoring structures; a second anti-abrasive application station for applying at least one second portion of anti-abrasive element; a first sidewalls building station for applying at least one first portion of the sidewalls of the tyre being processed.

A carcass structure being processed on a forming drum in the carcass structures building line 12 will be moved through all or part of the aforementioned stations 120 based on the geometric, structural and technological characteristics of the tyre model to be produced.

The plurality of work stations 140 of the crown structures building line 14 comprises at least two of the following stations: a sub-belt layer application station for applying a sub-belt layer onto a forming drum; a first belt application station for applying at least one first belt strip in a position radially outside the forming drum; a second belt application station for applying at least one second belt strip in a position radially outside the first belt strip; a zero degrees layer or strip application station for applying at least one first layer of cords, arranged circumferentially (at zero degrees with respect to the equatorial plane of the tyre), onto said at least one second belt strip; a tread band sub-layer building station for applying a sub-layer of the tread band in a position radially outside the belt structure; at least one tread band building station for applying at least one tread band in a position radially outside the belt structure; a second sidewalls building station for applying at least one second portion of sidewalls in a position axially outside the crown structure.

A crown structure being processed on a forming drum in the crown structures building line 14 will be moved through all or part of the aforementioned stations 140, based on the geometric, structural and technological characteristics of the tyre model to be produced.

The building lines 10 advantageously also comprise at least one station (not shown) for controlling and/or labelling the green tyres built in them, before they are transferred to the storage areas 20.

Advantageously, the building lines 10 each also comprises an elementary semi-finished products preparation line 18. The elementary semi-finished products are adapted to be fed into the carcass structures building lines 12 and/or into the crown structures building lines 14 through suitable elementary semi-finished products feeding stations 19.

Preferably, the elementary semi-finished products prepared in the elementary semi-finished products preparation line 18 are rubber-coated textile or metallic cords or bands used for building some structural components of the tyre like for example carcass plies, belt strips, reinforcements. The bands are applied onto the forming drums substantially alongside one another, in the different work stations to be used for making the carcass plies, the belt strips and the reinforcements. The rubber-coated textile or metallic cords are, on the other hand, wound by spinning, forming, for example, the aforementioned zero degrees layer of cords in a position radially outside at least said second belt strip.

Advantageously, the aforementioned stations for feeding elementary semi-finished products 19 are operatively associated with the reinforcement fabric application station and/or with the plies application station and/or with the first belt application station and/or with the second belt application station and/or with the zero degrees layer application station.

At least one of the work stations 120, 140 illustrated above, intended for making structural components of the tyre in elastomeric material only, like for example sub-liner, liner, anti-abrasive, sidewalls, tread band sub-layer, sub-belt layer, tread band, preferably comprises devices (not shown) for dispensing a continuous elongated element of elastomeric material to build the respective structural element of the tyre through a plurality of adjacent and/or at least partially juxtaposed coils of said continuous elongated element onto the forming drums.

The building lines 10 can also comprise devices (not shown) for adjusting the dimensions of the forming drums.

Advantageously, the carcass structures building lines 12 also comprise a temporary storage 122 for forming drums.

In a preferred embodiment, the building operations in some work stations 120 of the carcass structures building lines 12 are carried out with the help of pairs of support rings (not illustrated) suitably associated with the forming drums. In this embodiment, as well as the temporary storage 122 for forming drums, the carcass structures building lines 12 advantageously also comprise a temporary storage 123 for support rings, an association station 124 of support rings adapted to removably associate a pair of support rings with a respective forming drum and a support rings removal station 125 adapted to disassociate the pair of support rings from the respective forming drum.

The building lines 10 described above, giving the possibility of using different elementary semi-finished products for each built green tyre and forming drums of different dimensions, make it possible to simultaneously produce tyres of different models in terms of geometric, structural and/or technological characteristics.

In the plant 1 there can thus simultaneously be mass production tyres and tyres under development/industrialisation, having different specifications and subspecifications. For tyres under development/industrialisation, the specifications/sub-specifications of the tyres made can vary very often within the same work shift.

In this context of high technological flexibility, the plant 1 of the invention ensures a flexible management of pick-up and sending of the green tyres from the storage areas 20 to the vulcanizers 30.

Indeed, the plant 1 comprises a processing unit 50 adapted to associate each vulcanizer 30 with a respective pick-up logic of green tyres from the storage areas 20 and, upon each request to vulcanize a green tyre in a vulcanizer 30, to apply the pick-up logic associated with said vulcanizer 30 to drive the transfer devices 70 so that they select and pick up a green tyre from the storage areas 20 as a whole and transfer it to the vulcanizer 30.

The pick-up logic is a programmable logic that can be programmed taking into account the green tyres actually stored in the storage areas 20, the green tyres being built in the building lines 10, the green tyres that will be built in the building lines 10, according to predetermined production plans, and the current requirements of the production plant 1.

Advantageously, the pick-up logic associated with each vulcanizer comprises a first pick-up rule of green tyres from the storage areas 20. According to the requirements of the production plant 1, such a first rule is advantageously changed by the processing unit 50, for at least one of the vulcanizers 30, into at least one second pick-up rule, at least once during the production of at least one lot of tyres.

The pick-up rules can, for example, be selected among the following pick-up rules: FIFO on a specification $Sp_j$ for which the vulcanizer is configured; FIFO on a predetermined subspecification $Su_h$ of the specification $Sp_j$ for which the vulcanizer is configured; LIFO on a specification $Sp_j$ for which the vulcanizer is configured; LIFO on a predetermined subspecification $Su_h$ of the specification $Sp_j$ for which the vulcanizer is configured; punctual selection of a specific green tyre; random selection of a green tyre.

The processing unit 50 can, for example, be a personal computer (PC).

The processing unit 50 can advantageously be positioned in a remote position with respect to the storage areas 20.

Figure 4:
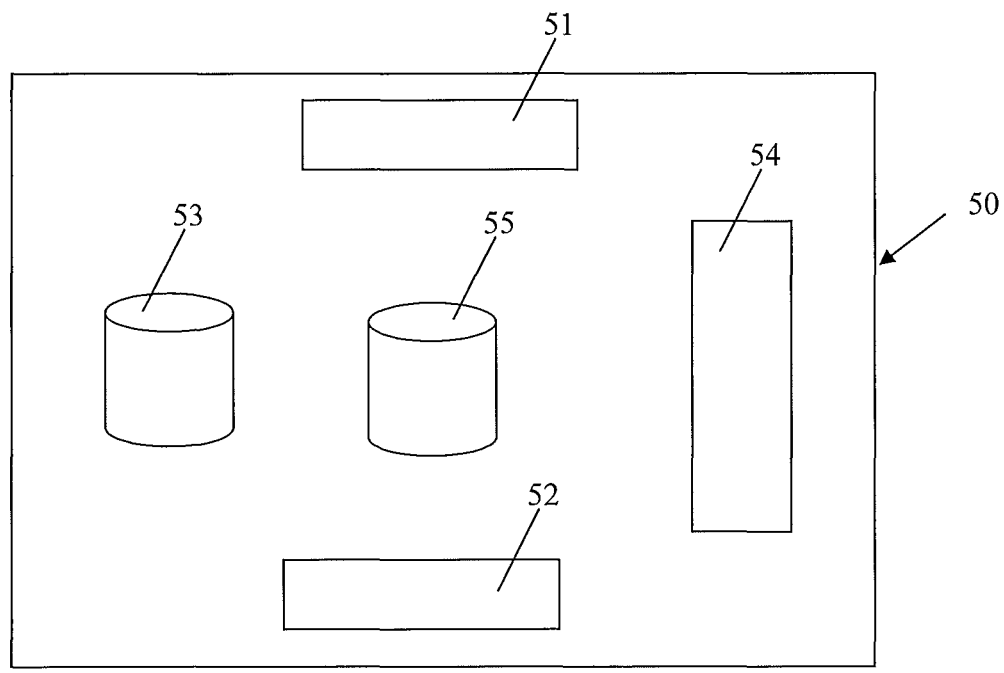
FIG. 4 schematically shows an embodiment of a processing unit of a production plant according to the invention.

FIG. 4 schematically shows an embodiment of the processing unit 50 comprising: a vulcanizers interface 51; a transfer devices interface 52; a database 53 adapted to store information on the positions present in the storage areas 20, equipped with tyre identifier (for example barcode), specification, subspecification and/or production data of the green tyre, if present, which occupies such a position; a user interface 54; a memory area 55 adapted to store the pick-up logic associated with the various vulcanizers 30.

Figure 5:
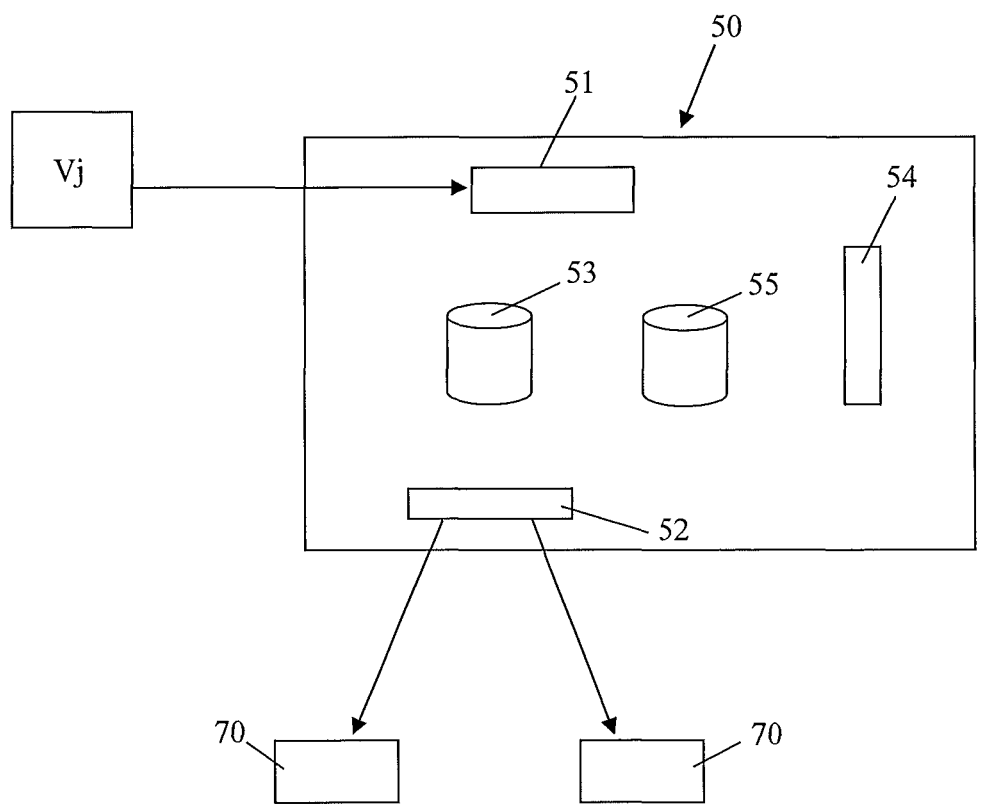
FIG. 5 schematically shows how a request to vulcanize a green tyre in a vulcanizer $V_j$ is processed according to an embodiment of the invention.

As schematically shown in FIG. 5, when a vulcanizer (30) $V_j$ is ready to vulcanize a new green tyre, the processing unit 50 receives, through the vulcanizers interface 51, a request to vulcanize a green tyre in the vulcanizer (30) $V_j$. Upon receiving such a request, the processing unit 50 is advantageously adapted to interrogate the memory area 55 to obtain the pick-up rule currently associated with the vulcanizer (30) $V_j$. Once such a current pick-up rule has been obtained (for example FIFO on subspecification $Su_1$ of the specification $Sp_2$), the processing unit 50 is adapted to interrogate the database 53 in order to obtain information on the positions of the storage areas 20 that house green tyres that satisfy such a rule (for example the positions that house green tyres having subspecification $Su_1$ of the specification $Sp_2$) and to drive, through the transfer devices interface 52, the transfer devices 70 so that they pick up from such positions the green tyre that satisfies the current pick-up rule and transfer it to the vulcanizer (30) $V_j$.

The user interface 54 allows a user (for example a manager of the production plant 1) to set and vary the pick-up rules associated with the various vulcanizers 30.

Figure 6:
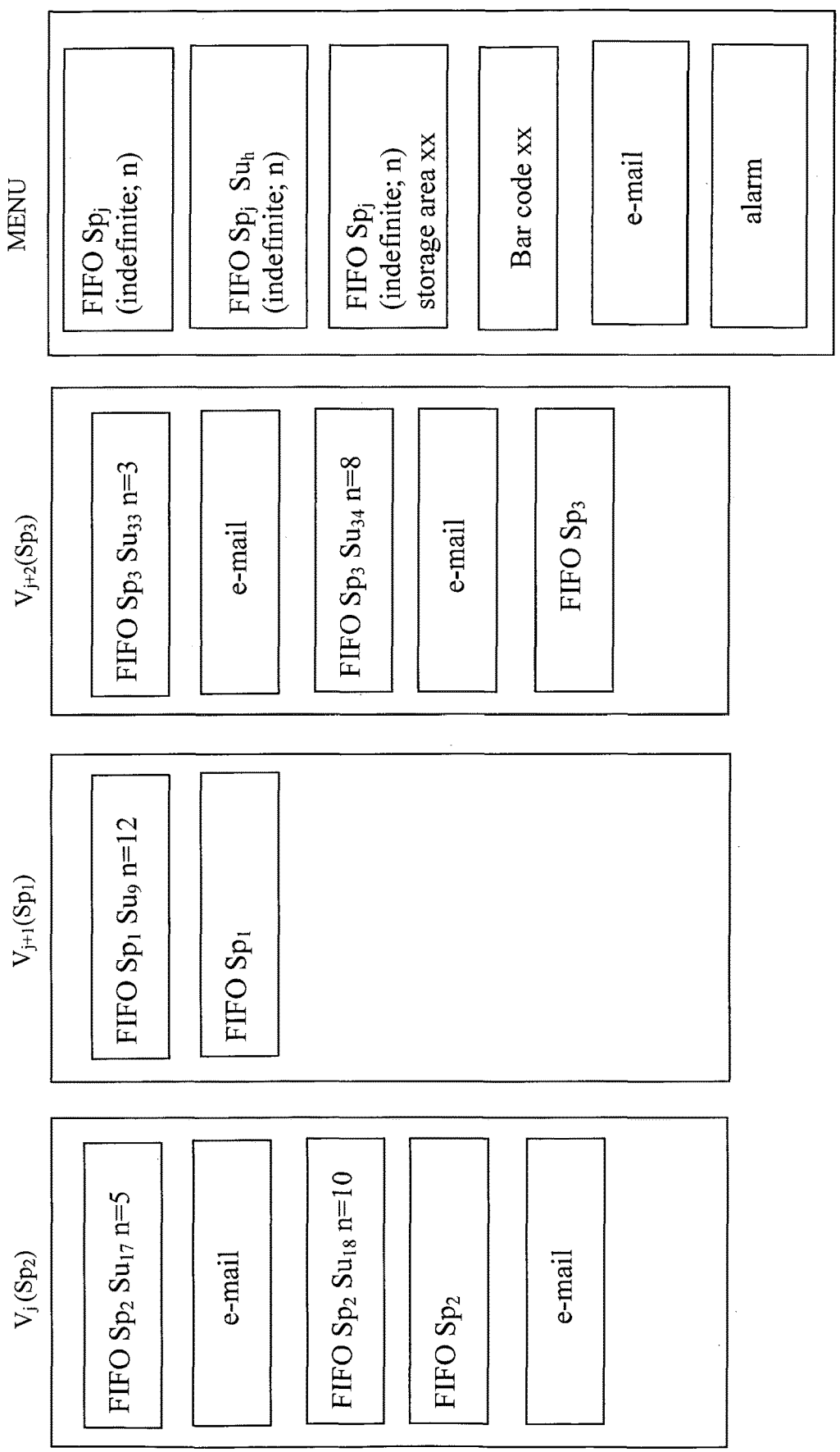
FIG. 6 schematically shows examples of pick-up rules that can be associated with vulcanizers $V_1$, $V_{j+1}$, $V_{j+2}$, selecting from a menu of commands.

FIG. 6 schematically shows examples of pick-up rules that can be associated with three vulcanizers (30) $V_j$, $V_{j+1}$, $V_{j+2}$, respectively configured to vulcanize specifications $Sp_2$, $Sp_1$, $Sp_3$, selecting from a menu of possible commands. In the illustrated example, the possible commands are FIFO on specification $Sp_j$, FIFO on subspecification $Su_h$ of specification $Sp'$, FIFO on specification $Sp_j$ in determined storage area XX, punctual selection of a tyre identified by barcode XX, send e-mail, send alarm. The FIFO commands also provide the possibility of indicating a number of green tyres on which the rule should be applied (undefined or defined number n).

The FIFO pick-up rule on specification $Sp_j$ can advantageously be associated by default with all of the vulcanizers 30 so as to make it possible, in the absence of particular requirements, to vulcanize the oldest green tyres present in the storage areas 20. When, on the other hand, there are particular requirements of the production plant 1, such a FIFO pick-up rule can be changed by a user (for example into punctual pick-up logics or on predetermined subspecification $Su_h$ of specification $Sp_j$) through the user interface 54.

In the example of FIG. 6 the vulcanizer (30) $V_j$ is associated with a plurality of rules to be carried out in sequence: FIFO on subspecification $Su_{17}$ of specification $Sp_2$ for 5 green tyres; send e-mail; FIFO on subspecification $Su_h$ of specification $Sp_2$ for 10 green tyres; FIFO on specification $Sp_2$ for an undefined number of green tyres; send e-mail.

In such an example, faced with a request to vulcanize a green tyre in the vulcanizer (30) $V_j$, the processing unit 50 will interrogate the database 53 to verify whether in the storage areas 20 there is a green tyre that satisfies the FIFO rule on subspecification $Su_{17}$ of specification $Sp_2$. In the positive case, the processing unit 50 will drive the transfer devices 70 so that they pick up from the storage areas 20 a green tyre according to the FIFO rule on subspecification $Su_{17}$ of specification $Sp_2$ and will decrease the number of green tyres on which to apply such a rule (which, in the example will go from 5 to 4). When the number of green tyres on which to apply such a rule has ended, such a rule will be eliminated from the configuration of the vulcanizer (30) $V_j$, a notification e-mail will be sent, for example to the system manager, of possible anomalies or of the end of the processing of the specification in progress and, upon the next vulcanization request for the vulcanizer (30) $V_j$, the next pick-up rule associated with it will be applied. In the case in which there is no tyre in the storage areas 20 that allows the current pick-up rule to be satisfied (for example FIFO on subspecification $Su_{17}$ of specification $Sp_2$), the processing unit 50 can advantageously be adapted to send a notification e-mail, for example to the system manager, on the current anomaly and to move on to the next pick-up rule, still keeping the outstanding pick-up rule active waiting for green tyres that satisfy such a rule to be stored in the storage areas 20.

It should be observed that the pick-up rules are associated with each vulcanizer 30 in the sense that, once assigned, they can be changed at any moment and many times within the same work shift, as a function of new and different requirements of the production plant 1.

FIGS. 7-10 schematically illustrate the advantages that can be obtained through the invention with respect to a production plant using a single FIFO pick-up logic.

Figure 7:
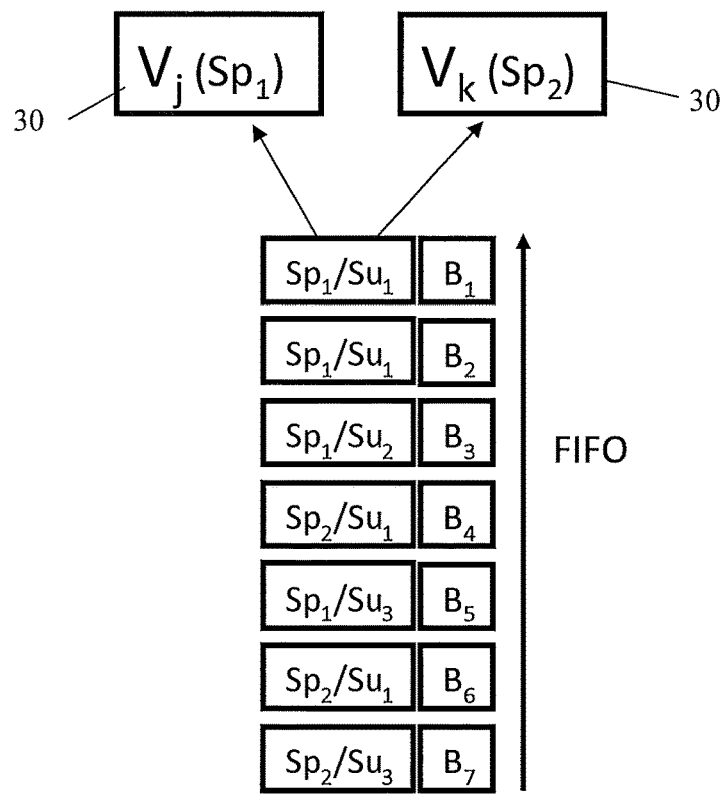
FIG. 7 schematically shows seven green tyres produced in sequence by a building line and stored in a storage area according to a FIFO logic.

In particular, FIG. 7 shows an example of a production plant 1 in which: the building line 10 produces tyres according to two specifications $Sp_1$ and $Sp_2$ and relative subspecifications $Su_1$, $Su_2$ and $Su_3$; the tyres produced are identified through barcodes $B_1$-$B_7$ and stored in the storage area 20; the two vulcanizers (30) $V_j$ and $V_k$ are configured to vulcanize green tyres respectively having specifications $Sp_1$ and $Sp_2$ and they have an associated FIFO pick-up rule on the specifications $Sp_1$ and $Sp_2$, respectively.

Figure 8:
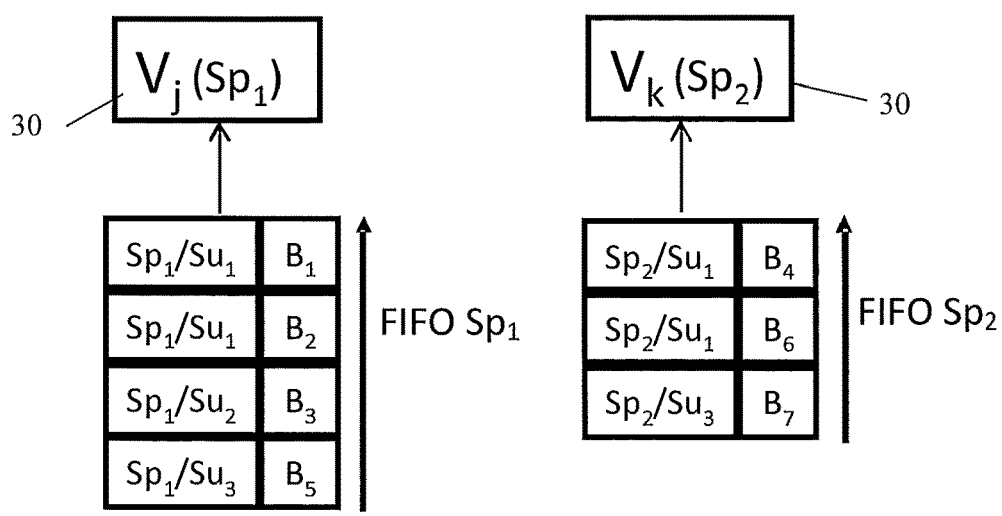
FIG. 8 schematically shows how the seven green tyres of FIG. 7 are vulcanized in two vulcanizers $V_j$ and $V_k$ respectively configured for two specifications $Sp_1$ and $Sp_2$, when a FIFO pick-up logic is applied to the storage area on the specifications $Sp_1$ and $Sp_2$.

FIG. 8 schematically shows how the green tyres are picked up from the storage area 20 and transferred to the two vulcanizers $V_j$ and $V_k$, applying such FIFO pick-up rules.

Assuming that on the building line 10, having a tyre with specification $Sp_1$ and Subspecification $Su_1$ under production, it has become necessary to intervene on the specification $Sp_1$ creating two subspecifications $Su_2$ and $Su_3$ due to problems in terms of quality and/or industrialisation and/or research and/or development, from FIG. 8 it can be seen that, using the FIFO pick-up logic on the specification $Sp_1$, the results of the subspecification $Su_2$ can only be seen after having vulcanized the two green tyres with the specification $Su_1$. Similarly, the results of the subspecification $Su_3$ can only be seen after having vulcanized the two green tyres with the subspecification $Su_1$ and the green tyre with the subspecification $Su_2$.

Figure 9:
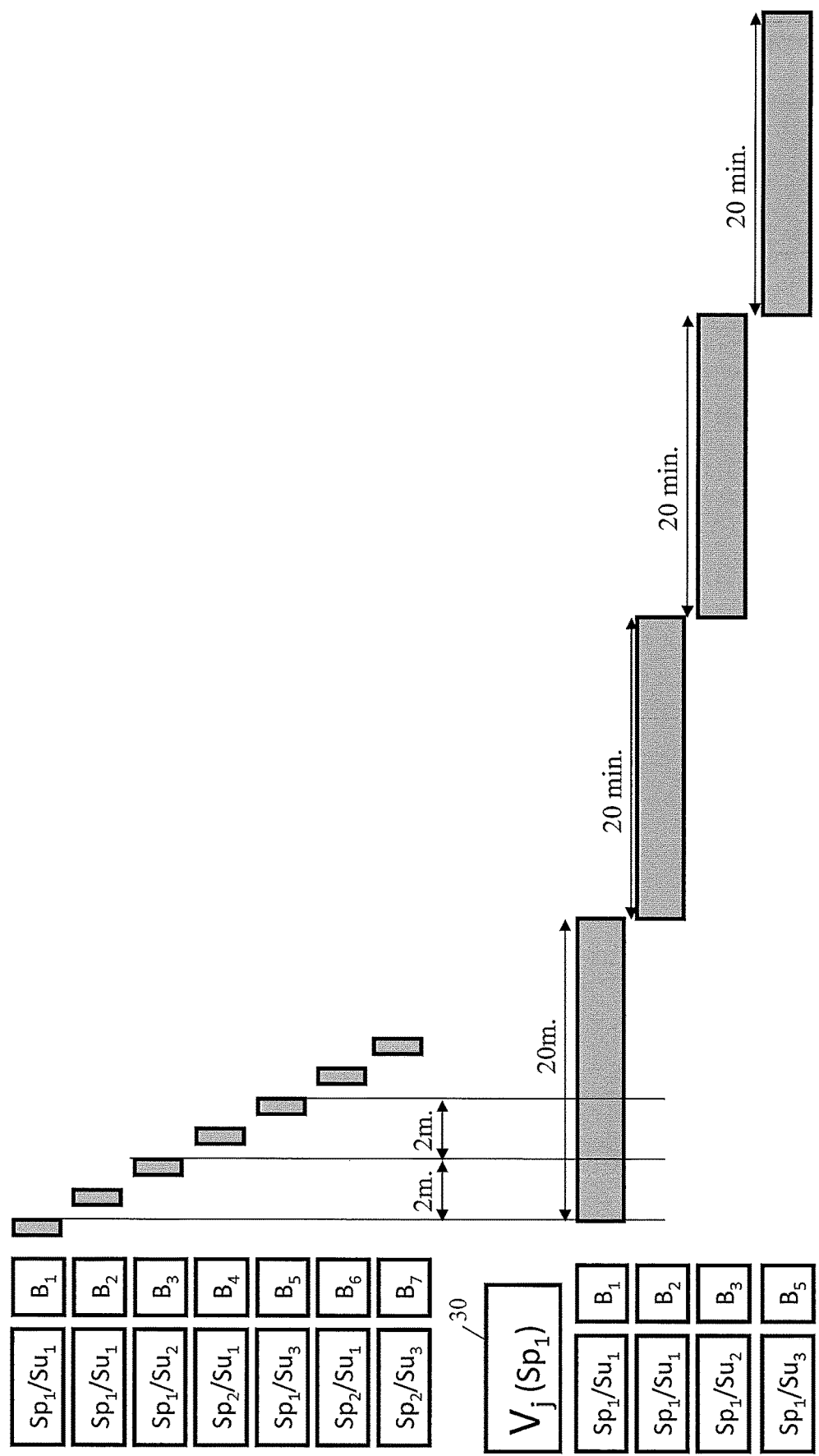
FIG. 9 schematically shows the vulcanization times in the vulcanizer $V_j$ when the FIFO pick-up logic is applied on specification $Sp_1$.
Figure 10:
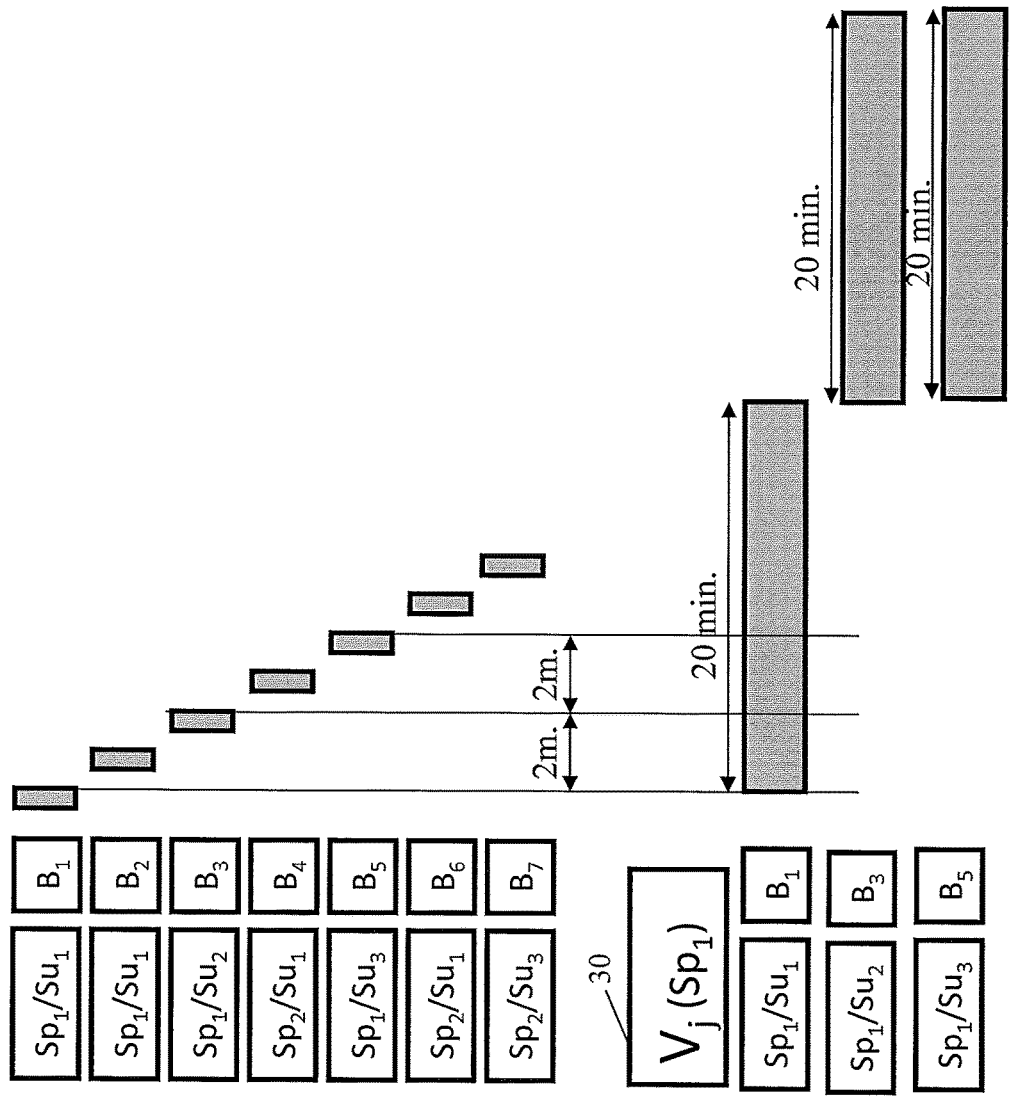
FIG. 10 schematically shows the vulcanization times in the vulcanizer $V_j$ when passing from a FIFO pick-up logic on specification $Sp_1$ to a FIFO pick-up logic on subspecification $Su_2$, or $Su_3$, on specification $Sp_1$.

As schematically illustrated in FIG. 9, assuming an average building cycle time (i.e. an output frequency of green tyres from the building line $L_j$) of 60 seconds and a vulcanization time of 20 minutes, to see the results of the subspecification $Su_2$ it is necessary to wait 58 minutes from when it is built. In turn, in order to see the result of the subspecification $Su_3$ it is necessary to wait 76 minutes from when it is built.

This can cause serious inefficiencies in the production plant 1, especially in the cases in which the tyres to be vulcanized before the specification of actual interest are in a large quantity. In such a system using a single FIFO pick-up logic, such waiting times could, for example, be avoided by momentarily stopping the vulcanizer $V_j$ and intervening manually on the storage areas to unload the green tyres that precede the subspecification of current interest from the storage. However, such a manual intervention would be extremely disadvantageous in terms of efficiency, flexibility and costs of the production plant. The aforementioned problems are overcome by the production plant of the invention in which the processing unit 50 is adapted to change the first FIFO pick-up rule on the specification $Sp_1$ into a second FIFO pick-up rule on the subspecification $Su_2$ (or $Su_3$) of the same specification $Sp_1$. As shown schematically in FIG. 10, in the hypothetical cases given above, such a change of rule does, indeed, allow the waiting times to see the result on the subspecification $Su_2$ to be reduced from 58 minutes to 38 minutes and on the subspecification $Su_3$ to be reduced from 76 minutes to 36 minutes.

The invention claimed is:

1. A method for producing at least one lot of tyres for vehicle wheels comprising:
   storing, after production, green tyres in one or more storage areas without an assigned pick-up logic associated with a respective green tyre, said green tyres have specifications $Sp_j$ and, for each specification $Sp_j$, subspecifications $Su_h$, with $1 \le j \le n$, $1 \le h \le m$, and n, and m are integers greater than or equal to 1;
   associating each vulcanizer from a plurality of vulcanizers of a production plant with a respective pick-up logic of different pick-up logics for green tyres from any one of said one or more storage areas of green tyres, wherein the respective pick-up logic is different for at least two vulcanizers of the plurality of vulcanizers and the respective pick-up logic once assigned with each vulcanizer is configured to be changed as a function of requirements of the production plant during the production of the at least one lot of tyres;
   upon each vulcanization request, applying the pick-up logic associated with a vulcanizer of the plurality of vulcanizers to select and pick up a green tyre from any one of said one or more storage areas; and
   transferring the green tyre thus selected and picked up to said vulcanizer,
   wherein: the respective pick-up logic associated with each vulcanizer comprises a first pick-up rule of green tyres from any one of the one or more storage areas, each vulcanizer is configured for the first pick-up rule and at least one second pick-up rule, the respective pick-up logic for each vulcanizer is configured to change during the production, and, for at least one of said vulcanizers, based on an input received via a user interface, said first pick-up rule is changed into the at least one second pick-up rule at least once during the production, in said plant, of the tyres while said first pick-up rule is maintained for at least one other of said vulcanizers, and further wherein, for the at least one of said vulcanizers, the at least one second pick-up rule is changed into a third pick-up rule during the production, and the third pick-up rule is different from the first pick-up rule and the at least one second pick-up rule,
   wherein each vulcanizer of said plurality of vulcanizers is configured to vulcanize a green tyre associated with a predetermined specification of said specifications $Sp_j$,
   wherein the first pick-up rule is different from the at least one second pick-up rule, and the first pick-up rule, the at least one second pick-up rule, and the third pick-up rule are each chosen from: First In First Out on the specification $Sp_j$ for which the respective vulcanizer is configured; First In First Out on a predetermined subspecification $Su_h$ of the specification $Sp_j$ for which the respective vulcanizer is configured; Last In First Out on the specification $Sp_j$ for which the respective vulcanizer is configured; Last In First Out on a predetermined subspecification $Su_h$ of the specification $Sp_j$ for which the respective vulcanizer is configured; punctual selection of a specific green tyre; and random selection of a green tyre, and
   wherein each of said one or more storage areas is configured to allow for application of any of the first pick-up rule and the at least one second pick-up rule.

2. The method according to claim 1, wherein the punctual selection of a specific green tyre is carried out through a univocal green tyre identifier.

3. The method according to claim 2, wherein the punctual selection of a specific green tyre is carried out by using a suitable label containing the univocal green tyre identifier.

4. The method according to claim 1, wherein at least one of the first pick-up rule or at least one second pick-up rule comprises an indication of a number of green tyres on which the rule is applied.

5. The method according to claim 1, wherein when the production plant comprises two or more storage areas of green tyres, at least one of the first pick-up rule or at least one second pick-up rule indicates whether said pick-up rule should be applied to a specific storage area or to all the storage areas of the production plant or to a part of the storage area.

6. The method according to claim 1, wherein for a mass production, said first pick-up rule is a First In First Out pick-up rule on said predetermined specification $Sp_j$.

7. The method according to claim 1, wherein for a mass production, said first pick-up rule is a First In First Out pick-up rule on a predetermined subspecification $Su_h$ of said predetermined specification $Sp_j$.

8. The method according to claim 1, wherein said at least one of said vulcanizers, for which said first pick-up rule is changed into said at least one second pick-up rule, is configured to vulcanize green tyres associated with a predetermined specification $Sp_j$ relative to a developing production.

9. The method according to claim 1, wherein the green tyre is selected and picked up from said at least one storage area and transferred to said vulcanizer through at least one transfer device.

10. The method according to claim 1, wherein each of the specifications $Sp_j$ comprises respective information of at least one of an apparatus, a material, a machine path within the production plant and a moulding and vulcanization process for a green tyre of the green tyres, and wherein each of the specifications $Sp_j$ are unique from each other.

11. The method according to claim 10, wherein each of the sub-specifications $Su_h$ of each specification $Sp_j$ comprises information of a respective machine path within the production plant, which is different from the machine path information of the respective specification $Sp_j$.

12. A method for producing at least one lot of tyres for vehicle wheels comprising:
  storing, after production, green tyres in one or more storage areas without an assigned pick-up logic associated with a respective green tyre, said green tyres have specifications $Sp_j$ and, for each specification $Sp_j$, subspecifications $Su_h$, with 1≤j≤n, 2≤h≤m, and n is an integer greater than or equal to 1, and m is an integer greater than or equal to 2;
  associating each vulcanizer from a plurality of vulcanizers of a production plant with a respective pick-up logic of different pick-up logics for green tyres from any one of said one or more storage areas of green tyres, wherein each respective pick-up logic is different for at least two vulcanizers of the plurality of vulcanizers and the respective pick-up logic once assigned with each vulcanizer is configured to be changed as a function of requirements of the production plant during the production of the at least one lot of tyres;
  upon each vulcanization request, applying the pick-up logic associated with a vulcanizer of the plurality of vulcanizers to select and pick up a green tyre from any one of said one or more storage areas; and
  transferring the green tyre thus selected and picked up to said vulcanizer,
  wherein: the respective pick-up logic associated with each vulcanizer comprises a first pick-up rule of green tyres from any one of the one or more storage areas, each vulcanizer is configured for the first pick-up rule and at least one second pick-up rule, the respective pick-up logic for each vulcanizer is configured to change during the production, and, for at least one of said vulcanizers, based on an input received via a user interface, said first pick-up rule is changed into the at least one second pick-up rule at least once during the production, in said plant, of the tyres while said first pick-up rule is maintained for at least one other of said vulcanizers, and further wherein, for the at least one of said vulcanizers, the at least one second pick-up rule is changed into a third pick-up rule during the production, and the third pick-up rule is different from the first pick-up rule and the at least one second pick-up rule,
  wherein each vulcanizer of said plurality of vulcanizers is configured to vulcanize a green tyre associated with a predetermined specification, of said specifications $Sp_j$
  wherein the first pick-up rule is different from the at least one second pick-up rule, and at least one of the first pick-up rule, the at least one second pick-up rule, and the third pick-up rule is chosen from: First In First Out on a predetermined subspecification $Su_h$ of the specification $Sp_j$ for which the respective vulcanizer is configured; and Last In First Out on a predetermined subspecification $Su_h$ of the specification $Sp_j$ for which the respective vulcanizer is configured; and
  wherein each of said one or more storage areas is configured to allow for application of any of the first pick-up rule and the at least one second pick-up rule.

* * * * *